M. SKLOVSKY.
ENGINE GANG PLOW.
APPLICATION FILED DEC. 3, 1908.
1,299,044.
Patented Apr. 1, 1919.
2 SHEETS—SHEET 1.
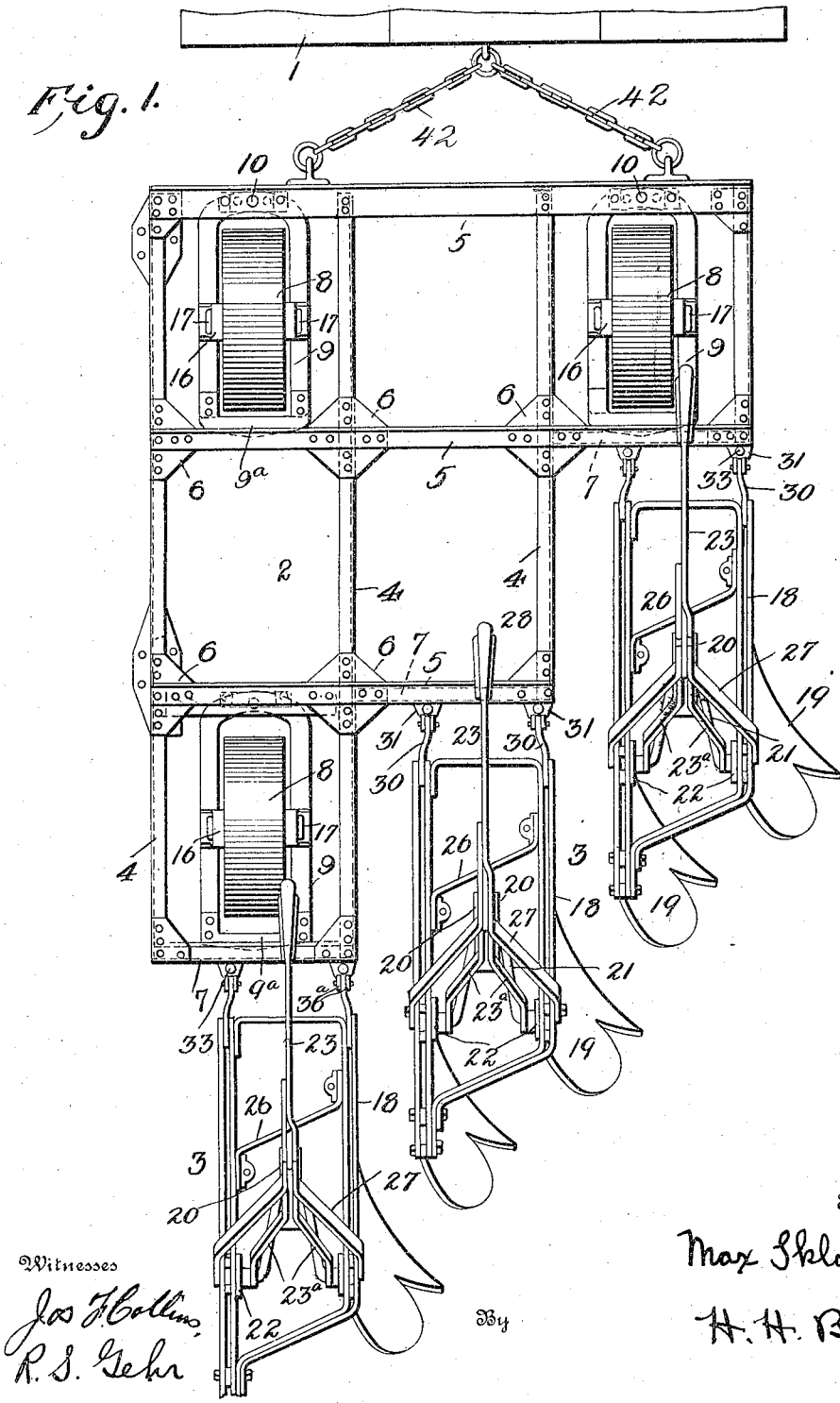

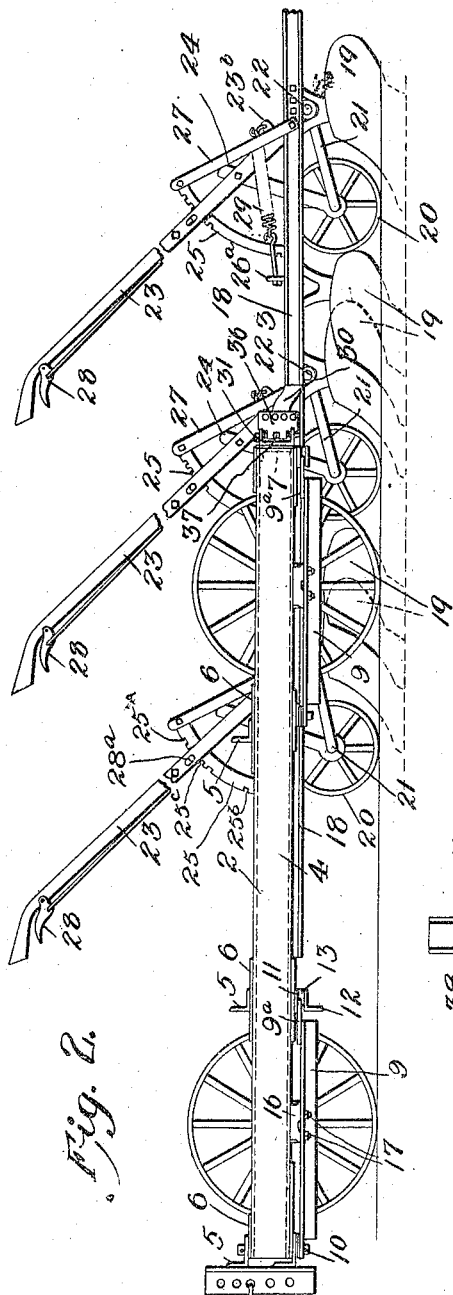

UNITED STATES PATENT OFFICE.

MAX SKLOVSKY, OF MOLINE, ILLINOIS, ASSIGNOR TO DEERE & COMPANY, A CORPORATION OF ILLINOIS.

ENGINE GANG PLOW.

1,299,044. Specification of Letters Patent. Patented Apr. 1, 1919.

Application filed December 3, 1908. Serial No. 465,875.

*To all whom it may concern:*

Be it known that I, MAX SKLOVSKY, citizen of the United States, residing at Moline, in the county of Rock Island and State of Illinois, have invented certain new and useful Improvements in Engine Gang Plows, of which the following is a specification, reference being had therein to the accompanying drawing.

This invention relates to engine gang plows of the type in which each is provided with the following principal elements: first, a main draft frame adapted to be hitched to a tractor; second, a series of plow beams or frames each connected to the draft frame by means of a horizontal hinging device held with its axis normally fixed in relation to the ground, preferably by being mounted directly upon the draft frame itself; third, a series of plow bodies connected normally rigidly to the beams or frames to form therewith rigid plowing units, each vertically movable in a fixed path about the aforesaid vertically fixed axis; and fourth, a series of ground-engaging supports (preferably wheels), each normally fixedly, but vertically adjustably, connected with one of the beams or frames and adapted to carry the beam and the body in normally fixed, but optionally changeable, relation to the surface of the ground.

With the several parts of the plow connected and related as above set forth, it will be clear that as the main frame advances the several plowing units will trail behind it and will follow closely the irregularities of the surface of the ground, each being supported upon its own individual ground wheel. Each plow body has, for any given position of the wheel or for any given elevation, a fixed working angle, that is, a fixed angle between its longitudinal lines and the horizontal. This angle is usually such that the plow body tends to suck into the ground to a depth slightly in excess of that which the supporting wheel permits. For instance, if the body is so related to the main frame that it tends to enter the ground to a depth of, say, six inches, the ground wheel, by virtue of its vertical adjustability, can be used either to permit plowing at the full six inches depth or to limit the depth to, say, five inches or four inches. If deeper plowing is desired, the operator must change the working angle, that is, he must change the angle between the longitudinal lines of the plow body and the horizontal independently of those changes resulting from a movement of the unit as a whole about its front axis. By changing this angle, the body can be caused to seek a lower depth, as for instance, nine inches, and the ground wheel can again be used either to permit plowing at the full nine inches depth or to limit the depth to, say, eight inches or seven inches. It is never desirable to use the ground wheel to support the plow body at a position much above its normal depth, as in that case the body is carried at an inefficient position and the wheel is subjected to heavy down stresses, both of which conditions greatly increase the required draft.

From the foregoing description, it will be clear that for the successful operation of a plow of this type for different depths of plowing and under different soil conditions the working angle and the position of the supporting wheel, vertically, must be frequently changed and changed in careful relationship to each other, for the reason that the normal depth which the plow body tends to take must always be equal to, and preferably slightly in excess of, the desired depth without however being greatly in excess. Even for plowing at a uniform depth changes in the working angle are frequently desirable, as the suck of the plow varies with the soil conditions. Furthermore, in the construction of a plow, minor inaccuracies are unavoidable and the initial working angle may be, and usually is, slightly different from the predesigned angle, correction being on this account necessary.

The principal object of my invention is to provide, in a plow of the type described having vertically adjustable ground engaging supports for the plowing units, means between the draft frame and the plow bodies which are capable of continually sustaining the draft of plowing, and which are capable, while sustaining the said draft, of being adjusted by the operator to change the working angles of the bodies. The exact suck of a plow body for a given working angle can never be determined accurately in advance as it depends largely upon soil conditions; and the working angle must therefore be determined by experiment during actual plowing. In a plow embodying my invention the operator while positioned on the main frame and watching the operation of the plow bodies can adjust the working angles of the bodies in whatever way is necessary without removing them from the ground or stopping their advance.

I prefer to effect the adjustment of the working angles of the plow bodies by raising or lowering the front ends of the beams, thus changing the angles of the entire plowing units; but it will be understood that other means of adjustment of the working angles may be used when desired. I find it preferable to effect the adjustment of the front ends of the beams by moving the pivots upward or downward with respect to the frame. In this way I am enabled to locate the adjusting devices upon the relatively large and heavy frame instead of on the relatively small and light beams. Preferably, the vertical movements of the pivots are effected by means of screw mechanisms which permit very fine and close adjustments and which automatically lock to prevent movements of the parts out of adjusted positions.

Each plow must be adapted for a very wide range of adjustment not only of the supporting wheel but also of the working angle; and the required range of adjustment of the working angle is so great that it cannot be obtained by screw devices, such as I find preferable for providing the necessary nicety of adjustment. I therefore combine with the screw devices, which are used for the ordinary frequent adjustments, supplemental means whereby extraordinary and more extensive adjustments are made possible.

In a plow of this character it is also essential that the plow bodies be properly leveled or "winged," that is, properly positioned angularly with respect to transverse horizontal lines. Sometimes, on account of initial inaccuracy of construction, or on account of wear, the plow bodies are so positioned in this respect that the most efficient plowing is not obtained. And it is further found that the transverse angular position must be varied somewhat as the depth of plowing is changed. The angular position must be varied somewhat as the depth of plowing is changed; one angular position is found most efficient for one depth and another angular position most efficient for another depth.

A further object, therefore, of my invention is to provide, in combination with the devices before referred to, means for effecting transverse angular adjustment or winging of the bodies in accordance with wear, or to meet other conditions. By preference, I provide two transversely separated screw adjusting devices for each beam at its front end. These adjusting devices are independently operable, and the operator, therefore, can not only vertically adjust the front end of the beam as a whole, but, by operating one of the devices independently of the other, can cause the plow unit as a whole to swing transversely about a longitudinal axis. While I prefer means for transversely adjusting or winging the plow bodies, such as I have just referred to, it will be understood that other means may be substituted when preferred.

Of the accompanying drawings which illustrate the preferred form of my invention—

Figure 1 is a plan view of a plow embodying my improvements;

Fig. 2 is a side elevation of the apparatus shown in Fig. 1;

Fig. 3 is a side view of a coupler device of one of the forms which can be used for connecting the plow units to the draft frame;

Fig. 4 is a horizontal section on the line 4—4 of Fig. 3.

In the drawings, 1 indicates, conventionally, part of a tractor or engine; 2 the intermediate draft frame, and 3—3 the plowings units.

As concerns the details of the tractor, or of the main frame 2, it is to be noted that they may be of any suitable sort. The main frame, as an entirety, is approximately triangular in form and has a series of plow attaching points which are situated obliquely to the line of draft. The frame which is illustrated has longitudinal bars 4—4, transverse bars 5—5, and bracing and joining devices at 6—6 for these bars. 7—7 are bars secured to the above parts of the framework and serving as means to which the plowing units are attached.

The main frame is shown as carried by a wheel system, comprising the three caster wheels 8, one in the rear and two on a transverse line in advance. These hold the frame in substantially the same positions relative to the ground surface at all times and furnish fixed abutting points for the plowing units. It is not necessary to herein describe in detail the features of construction and arrangement for the frame supporting wheels as those matters constitute the subject-matter of other applications for patent which I have filed, namely, Serial No. 488,413, filed April 7, 1909, upon which Patent No. 1,056,713 was issued on March 18th, 1913, and Serial No. 530,220, filed November 27, 1909, as a division of this application.

Each plow unit 3 is shown as having a rigid, substantially rectangular beam or frame 18 and also as having two plow bodies 19; but it will be understood that many of the matters incident to the present improvements can be employed where units are used each having but a single body, and where the frame, or beam element, is a single bar, or where a compound bar narrower than that shown is used; these being matters well known to plow designers at the time of my invention. Each body 19 is secured to its beam element in such way as to be held rigidly in relation thereto when at work.

The beam or frame 18 is provided at its front end with upward extending arms 30 which are adapted to be received by clevis coupling devices 31. Each of these couplings 31 comprises a bracket 32 bolted, or otherwise secured, to the main plow frame, and having its ends bent at right angles and perforated to receive an upright screw spindle 33. The spindle is free to turn in the bracket 32, but is held against longitudinal movement by pins 34, 35, as well as by the shoulder on the lower end of the spindle which engages the lower arm of the bracket. 36 is a draft member in the form of a clevis which comprises the plate parts 36$^a$ connected by strips 36$^b$, which are bent around the screw spindle 33. A nut 37 is mounted on the spindle 33 between the strips 36$^b$ and is held against rotation by its engagement with the edges of the plate parts 36$^a$ of the clevis. The ends of the bracket 32 are preferably notched at 38 and 39 to receive the edges of the plate parts 36$^a$ of the clevis, and the latter thus braced is prevented from turning on spindle 33. The latter is squared at its upper end to receive a wrench or handle. It will be seen that by the rotation of the spindle, the clevis 36 may be adjusted up or down.

The forward extending arms 30 of the individual gang frames are received between the plates 36$^a$ of the clevis and are connected thereto by means of coupling pins 40. The plates 36$^a$ are provided with a vertical series of holes 41, and the coupling pins are placed in one or another of these holes, according to the character of the plowing to be done. Thus, each individual unit has a relatively wide two-point connection with the frame which, while it permits the plow bodies to rise and fall freely, holds them firmly against wide swinging.

The distance from one coupler to the other is sufficiently great, and there is sufficient looseness in the fitting to permit either of the nuts 37 to be raised or lowered in relation to its companion nut to an extent sufficient to cause the turning of the beam and the body around longitudinal axial lines enough to effect the leveling of the bodies, or, if occasion requires, to "wing" them, that is, slightly turn them downward on the left hand side or the right.

Each plow unit has a ground-engaging body-supporting device 20, here a rolling wheel, bearing on the ground. It is mounted upon a carrier 21 which is pivoted at 22 in relation to the body and the beam element. This wheel is optionally movable vertically and so arranged that when it is in its lowermost position, it and its carrier 21 are adapted to support the body in a position above the ground surface; and when the wheel and its carrier are in relatively higher positions, they permit the plow body to come to, and enter, the earth; and the body can enter deeper and deeper, according to the positions at which the wheel and its carrier are held. To fasten them in different depth regulating positions, I have provided a toothed segment 25 secured at one end to the beam element at 26, and at the other end to bars 27 which are fastened to the beam. This segment has not only an uppermost lock notch at 25$^a$ and a lowermost notch at 25$^b$, but a series of closely adjacent notches at 25$^c$ near that at 25$^a$.

28$^a$ is a latch adapted to enter any of the notches referred to, and while in any one of them, locks the wheel and its bail or carrier 21 against vertical movement. The lock latch 28$^a$ is carried by an elongated lever 23 which is connected to the wheel 20 and its carrier by arms 24 that extend to the wheel mounting, the ends of the two parts 23$^a$ of the lever being connected at points near the axis at 22. The lever 23 of each plow unit extends to a point where it is accessible to the plowman standing on the platform of the frame 2. The lock latch 28$^a$ has a draft rod and a thumb piece at 28, supported at the handle end of the lever, these parts in connection with the segment notches, constituting a latching and releasing device of well-known character.

29 is a spring, here an elongated, strong, spiral spring, arranged to act by tension, longitudinally. It is secured at one end to an arm 23$^b$ on the lever 23, and at its other end to an upstanding lug 26$^a$ on the cross brace 26. The tension of this spring tends to swing the bail 21 and the wheel 20 downward.

During transportation the lock latch 28$^a$ is held in the notch 25$^b$. When commencing to work, the plowman opens the lock and raises the forward end of the lever 23 until he has let the body down to the ground and permitted it to penetrate the latter to the depth desired. He then releases the lock and permits it to engage with the appropriate notch 25$^c$.

From the foregoing description, the operation of my improved plow will be readily understood.

When the plow is first set up the pivot pins 40 for each beam are placed in the proper holes 41 of the clevises to provide a working angle which is approximately correct for the depth of plowing for which the plow will ordinarily be used. The connections of the beams and the clevises after once being made need not ordinarily be changed. When the plow enters the field and reaches the proper position, the operator lowers the plow units by releasing the hand levers and sets the wheels for the desired depth of plowing by engaging the latches 28ᵃ with the proper notches 25ᶜ. The plow bodies at once enter the soil and plowing is commenced. The operator on the platform can watch the operation of each individual unit. If he finds that one of them is sucking in too hard, and thereby applying too great a force to its wheel, he can reduce the working angle thereof; or if, on the other hand, he finds that one of the units does not suck in to the required depth, he can increase the working angle to increase the depth. If, as plowing progresses, soil of a different sort is met with, so that the suck of the plow bodies is increased or decreased, the operator can promptly make the necessary changes in the working angle. If it is desired at any time to momentarily decrease the depth of plowing, this can be done by relatively lowering the wheels and thereby lifting the plow bodies. If the decrease is a marked one, and if it is to be maintained for a considerable time, the operator can correspondingly decrease the working angle and thus decrease the suck and decrease the load on the wheels. Or if the operator desires to increase the depth of plowing, he can do this by increasing the working angle and thereby increasing the suck, and at the same time relatively raising the wheels to permit the plows to enter farther into the ground.

Simultaneously with the adjustment of the working angles of the plow bodies, the operator can effect the leveling or winging of them in whatever way he finds necessary. As the depth of plowing is increased or decreased, the operator may find that winging of the bodies in one direction or the other will give improved results and this winging can be effected at the same time that the changing of the working angle is effected by turning one of the screws 33 more than the other.

What I claim is:

1. In a gang plow, the combination of a draft frame, a series of plow beams each having a body at its rear end and a hinge at its front end, the beam being rigid from the body to the hinge and the hinge being vertically but adjustably fixed directly on the frame, and held by it after adjustment at fixed distance from the ground, and being independent of the hinges of the other beams, means mounted on the frame for vertically adjusting each hinge independently of the others while the frame and the bodies are in motion to vary and fix the line of draft of the body while moving, a pressure and depth regulating wheel carried by the beam and situated adjacent to the body, and means for varying and fixing the relative position of said wheel to correspond to the varying positions of the beam hinge, said parts being constructed and arranged as described whereby each beam and its body independently of the others can be bodily raised or lowered at both the front end and the rear end of the beam while in operation to maintain proper relations between the line of draft and the suction of the body.

2. In a gang plow, the combination with a main draft frame fixed in relation to the ground surface, a series of plow bodies, a series of ground engaging supports supplemental to and independent of the frame and respectively near the bodies for carrying them independently of each other, a series of independent beams each having a hinge at the front end and a body at the rear end and being rigid from the body to the hinge, a vertically adjustable mounting for the hinge supported on the frame and holding the front end of the beam rigidly in relation to the ground surface, means permanently connected to each hinge for adjusting it vertically in horizontal parallelism to modify the suction angle of the body while it is moving and to vary the position of the axis of the hinge relative to horizontal planes to effect the leveling or winging of the plow.

3. In a gang plow, the combination with a main draft frame held in fixed relation to the ground surface, and a series of plowing units trailing behind the frame, each comprising a beam, one or more plow bodies normally rigidly secured to the beam and a ground engaging support supplemental to the frame and near the body or bodies for carrying the unit independently of the other units in normally fixed but manually variable relation to the ground, of a series of connecting devices interposed between the frame and the respective beams, each being independent of the others and comprising a horizontal hinge normally held in fixed relation to the ground surface and having an axis which passes through the beam and about which axis the beam and body are movable vertically in a fixed path and each also comprising means permitting vertical adjustment of the front end of the beam at either or both of two distinct points or at one of the said points while transmitting the draft of plowing and each of said connecting devices having all of its parts permanently united to the frame and to the beam.

4. In a gang plowing mechanism, the combination with a main draft frame held fixed in relation to the ground surface, and a series of independent plowing units trailing behind the frame, each comprising a beam, one or more plow bodies normally rigidly secured to the beam, and a ground engaging support supplemental to the frame and near the body or bodies for carrying the unit independently of the other units in normally fixed but manually variable relation to the ground, of a series of independent connecting devices interposed between the frame and the respective beams, each comprising a vertically adjustable horizontal hinge normally held in fixed relation to the ground surface about the axis of which the beam and body are movable vertically in a fixed path and each connecting device while transmitting the draft of plowing being manually adjustable to raise or lower the said hinge axis, all the parts of each of said connecting devices being permanently united to the frame and to the beam.

5. In a gang plow, the combination with a main draft frame, a series of plow bodies trailing behind the frame and a series of ground engaging supports supplemental to the frame and near the respective bodies for carrying them independently of each other in normally fixed but vertically adjustable relation to the ground surface, of a series of independent trains of connecting devices between the draft frame and the respective plow bodies, each train comprising a beam normally rigidly connected at its rear end to a body and flexibly connected at its front end to the frame at an axis normally held in fixed relation to the ground surface and each train while transmitting the draft of plowing being manually adjustable to change the working angle of the body or to level or wing the body and each of said trains having its parts permanently connected to the frame and to the body.

6. In a gang plow, the combination with a main draft frame, a series of plow bodies trailing behind the frame and a series of ground engaging supports supplemental to the frame and near the respective bodies for carrying them independently of each other in normally fixed but vertically adjustable relation to the ground surface, of a series of trains of connecting devices between the draft frame and the respective plow bodies, each train comprising a beam normally rigidly connected at its rear end to a body and flexibly connected at its front end to the frame at an axis normally held in fixed relation to the ground surface and each train while transmitting the draft of plowing being manually adjustable to raise or lower the front end of the beam or to level or wing the body.

7. In a gang plow of the class set forth, the combination of a main draft frame, a series of individual beams, one or more plow bodies secured to each beam, a pair of relatively widely spaced couplings between each of the individual beams and the main frame, each of said couplings comprising a draft member rigidly supported from the main frame and movable up and down relative thereto and means for adjusting said members up and down, a ground wheel movably mounted on each individual beam, and means for raising and lowering said ground wheel relative to its beam, said frame being pivoted directly to the draft members, whereby the raising and lowering of the ground wheel lowers and raises the plow body or bodies.

8. In a gang plow of the class set forth, the combination of a main draft frame, a series of individual beams, one or more plow bodies secured to each beam, a pair of relatively widely spaced couplings between each individual beam and the main frame, each of said couplings comprising a bracket rigidly secured to the main frame, a vertical screw spindle rotatably mounted to slide vertically relative to the bracket and a nut on the spindle engaging the clevis, a ground wheel movably mounted on each individual beam, and means for raising and lowering each ground wheel in relation to its beam, said beam being pivoted directly to the clevices, whereby the raising and lowering of the ground wheel lowers and raises the plow body or bodies.

In testimony whereof I affix my signature, in presence of two witnesses.

MAX SKLOVSKY.

Witnesses:
Eugene L. Taylor,
Roy E. Anderson.